June 10, 1958  B. L. AUSTIN  2,838,284
ROTARY DRILL BIT
Filed April 19, 1956  2 Sheets-Sheet 1
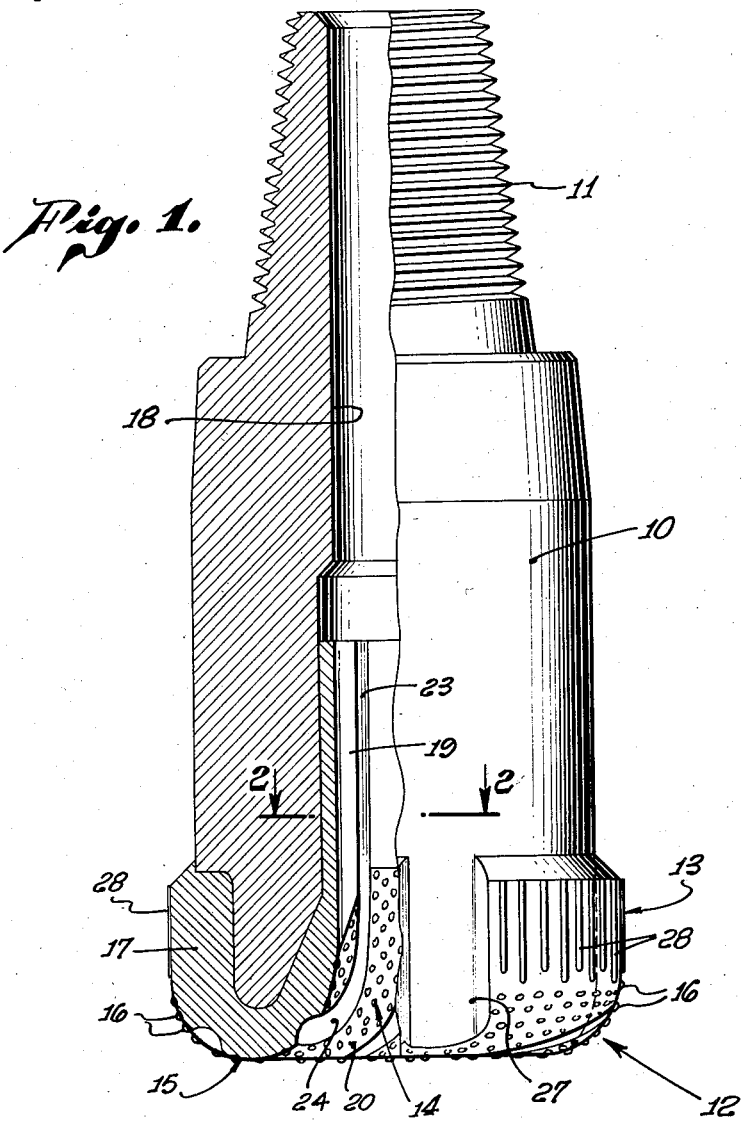
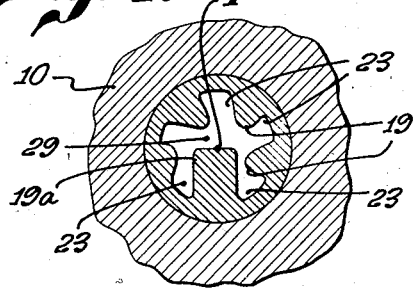
BENJAMIN L. AUSTIN
INVENTOR.
BY
Bernard Kriegel
ATTORNEY.

June 10, 1958  B. L. AUSTIN  2,838,284
ROTARY DRILL BIT
Filed April 19, 1956  2 Sheets-Sheet 2
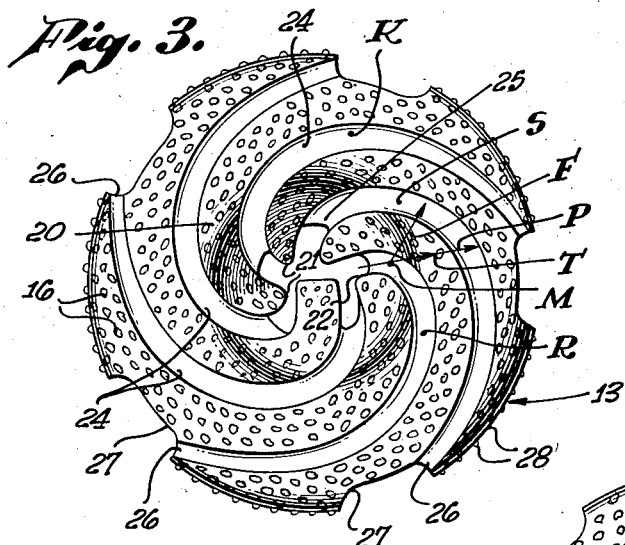
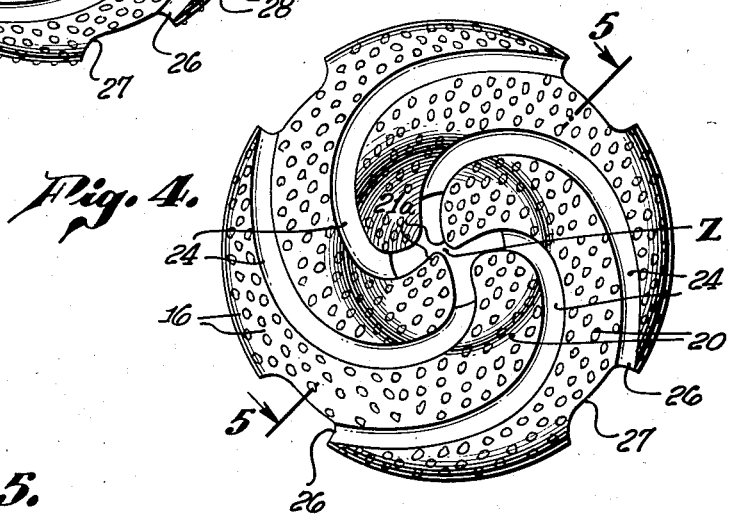
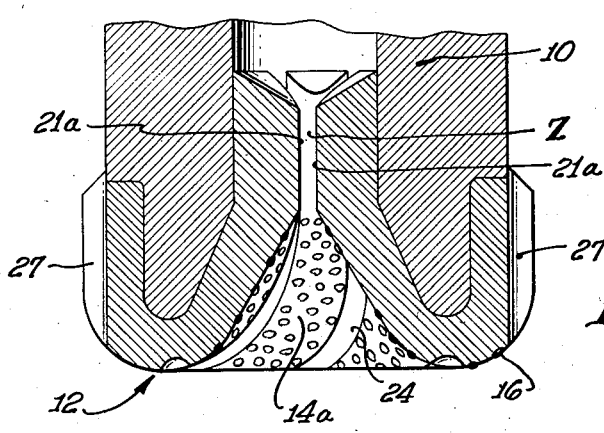
BENJAMIN L. AUSTIN,
INVENTOR.
BY
Bernard Kriegel
ATTORNEY.

United States Patent Office 2,838,284
Patented June 10, 1958

2,838,284
ROTARY DRILL BIT

Benjamin L. Austin, Ogden, Utah, assignor to Christensen Diamond Products Company, Salt Lake City, Utah, a corporation of Utah Application April 19, 1956, Serial No. 579,300

15 Claims. (Cl. 255—61)

The present invention relates to rotary drill bits, and more particularly to bits adapted to drill holes in relatively hard formations.

An object of the present invention is to provide a rotary drill bit embodying diamond cutting elements for drilling holes in relatively hard formations, which are maintained in a clean and cool condition during the drilling operation by circulating drilling fluid along its cutting faces in a novel manner.

Another object of the invention is to provide a rotary drill bit embodying diamond cutting elements for drilling the entire cross-sectional area of a hole in relatively hard formation, in which a large circulating area is available through the bit at its central portion for flushing the cuttings from the hole and for cooling the bit, the bit producing a generally conical shape in the bottom of the hole and effecting the removal of the axial portion of the cone so that it does not impede progress of the bit.

A further object of the invention is to provide a rotary drill bit embodying diamond cutting elements within its cutting faces for drilling the entire cross-sectional area of a hole in relatively hard formation, the bit having a large fluid circulating area therethrough for cleaning and cooling all cutting faces of the bit, the cutting elements extending to or adjacent the axis of rotation of the bit so as to prevent the production of a central core in the bottom of the hole which would impede drilling process.

An additional object of the invention is to provide a rotary drill bit embodying diamond cutting elements embedded in lands separated by water courses through which circulating fluid flows, the bit being adapted for drilling the entire cross-sectional area of a hole in relatively hard formation, the circulating fluid being caused to travel across the lands from one watercourse to another, thereby insuring the cleaning of all cutting faces and diamonds by the circulating fluid, and their maintenance in a comparatively cool state.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a combined longitudinal section and side elevation of a rotary drill bit embodying the invention;

Fig. 2 is a cross-section taken along the line 2—2 on Fig. 1;

Fig. 3 is a bottom plan view of the drill bit disclosed in Fig. 1;

Fig. 4 is a bottom plan view of a modified form of bit shown in Fig. 5;

Fig. 5 is a longitudinal section taken along the line 5—5 on Fig. 4.

The rotary drill bits disclosed in the drawings are especially adapted for drilling of the entire cross-sectional area of a hole in comparatively hard formations. The bit body 10 has a suitable upper connection 11, such as a threaded pin, for securing it to the lower end of a string of drill pipe (not shown), or the like, extending to the top of the hole, and it has a lower cutting portion 12 for drilling the hole to the desired diameter. The cutting portion includes an outer reaming face 13 for insuring the cutting of the hole to the proper cylindrical gauge, and also a central conical-like face 14 for drilling the central portion of the hole, producing a conical shape in the formation which will assist in centering the bit in the well bore, and insures its traversing a straight line path coaxially of the hole as drilling progress proceeds.

Between the reaming face 13 and the frusto-conical inner face 14, the bit is provided with a generally convex face 15 for drilling the outer portion of the bottom of the hole, this face merging into the outer reaming face 13 and also into the lower, large end of the frusto-conical face 14.

The bit disclosed performs its cutting action on the formation primarily through the action of diamond cutting elements 16, of the proper size, that are embedded in the reaming, convex and frusto-conical or concave faces 13, 15, 14 of the bit. These diamond cutting elements are embedded in a known manner in a matrix 17, of relatively hard material, secured to the main body or shank 10 of the tool.

The cuttings produced by the diamond cutting elements 16 and, for that matter, to some extent by the matrix 17 itself are removed by circulating or pumping fluid, such as drilling mud, down through the drill pipe, which will pass into the upper central passage 18 in the bit body and then down into the concave or frusto-conical portion of the bit. The fluid is caused to pass between a plurality of longitudinally extending and circumferentially spaced ribs 19 which project laterally inwardly from the wall of the passage 18, these ribs merging into lands 20 extending in spiral fashion along the frusto-conical cutting face 14 of the bit and then into the convex cutting face 15, the spiral extending outwardly substantially to the reaming face 13. Actually, the spiral lands 20 are spaced from one another circumferentially around the bit. Each land may be considered as beginning at the lower end 21 of a rib, which lower end is located at the upper end of the frusto-conical face 14 of the bit, continuing smoothly along the frusto-conical face 14 and convex face 15 to the reaming face 13. The lands 20 actually commence in the frusto-conical surface 14 at the inner end 22 of a rib 19, the lower rib ends or upper inclined portions 21 of the lands being separated by the longitudinal grooves 23 defined between and provided by the circumferentially spaced ribs 19 themselves. These grooves or fluid passages 23 between the ribs open at their lower ends into circumferentially spaced spiral waterways or watercourses 24, which actually bound and define the spiral lands 20 in the frusto-conical and convex faces 14, 15 of the drill bit. In effect, each watercourse 24 has its inlet 25 at the lower portion of a longitudinal groove 23 and its outlet 26 at the reaming face 13. If desired, and as specifically disclosed, the outlet end 26 of each watercourse may empty into the lower portion of a junk slot or groove 27 extending longitudinally of the reaming face 13, the slots 27 collectively providing a relatively large area through which the cuttings can pass upwardly around the exterior of the bit.

The diamonds 16, or corresponding elements, of the proper size, are embedded in the faces 13, 14, 15 of the bit for operation upon the formation material. The reaming stones may extend upwardly along the reaming face to a substantial extent, or the upper portion of the reaming face may be provided by circumferentially spaced longitudinally extending ribs 28 of the hard metal of which the matrix 17 is formed.

The ribs 19 do not extend inwardly into contact with one another, there being a comparatively small transverse space or gap 29 therebetween. This transverse space or gap will permit circulating fluid to discharge downwardly upon the central portion of the cone formed in the hole bottom by the concave or frusto-conical inner face 14 during the rotation of the bit. As the bit is rotating, the frusto-conical face 14 will be bearing upon a companion generally conical central portion of the hole bottom, whereas the convex face 15 will form a companion concave configuration in the outer portion of the bottom of the hole, this configuration merging into the cylindrical wall of the hole at its outer portion, and into the lower end of the cone 20 at its inner portion. The contacting of the several face portions 14, 15 by the hole bottom causes the latter to substantially cover the waterways or watercourses 24, which may then be considered as passages or conduits through which the circulating fluid will flow, in order to flush the cuttings from the drilling region outwardly toward the periphery of the bit, and thence upwardly around the exterior of the bit and the drill pipe to the top of the hole.

It will be noted that the waterways or watercourses 24 are in spaced relation to one another circumferentially around the bit, and that they are curved from a region near the axis of the bit to the periphery of the bit. The fluid being pumped through the drill bit will flow downwardly through the central fluid passage 18 and through the longitudinal grooves 23 between the ribs 19, passing into the waterways 24 and thence in an outward direction along the continually curving waterways 24 toward the periphery of the bit. Inasmuch as the fluid passing in the outward or lateral direction tends to resist curving and will, in effect, tend to pursue a straight-line course across the bit, it will leave one watercourse 24 and pass in a generally straight line and lateral direction across a land 20 to the next waterway. Of course, a large portion of the fluid itself will flow through the waterway itself, but a substantial quantity of the drilling fluid will shift transversely from one waterway toward another waterway, and in so doing will move across the lands 20 and the diamond cutting elements embedded therein. In this manner, not only will the cuttings be flushed through the waterways 24 to the periphery of the bit, but they will also be flushed from the lands 20 and the diamonds 16 themselves, to maintain the lands and diamonds in a clean and cool condition, avoiding a burning action in any areas of the lands that would result in loss of diamonds from the lands and their unavailability as cutting elements.

The spiral arrangement of waterways 24 and lands 20 therebetween causes each waterway and land to partake of an increasing angle with respect to a radial line drawn from the axis of the bit to the inner portion 21 or 25 of a land or waterway. This increasing angle to such a radial line results in a greater tendency for the drilling fluid to pass out of a waterway 24 and transversely across a land 20 to the next adjacent waterway. Such transverse movement of fluid from one waterway across a land to the next waterway is assisted by the fluid pressures in the waterways themselves, as will now be explained.

Referring to Fig. 3, fluid will enter the inlet 25 of waterway R and also the inlet of waterway S, and will commence to flow in an outward direction through these respective waterways. The fluid pressures at the inlets 25 to the two waterways will be equal. However, the fluid in one of the waterways R will resist the tendency to follow its curvature and will tend to proceed to a generally straight line direction, such as indicated by the arrow T toward the periphery of the bit. Such fluid will enter the waterway S at the point P, which is a much greater distance removed from the inlet of the waterway S than is the point M at which the fluid in the waterway R tends to leave such waterway in the direction of the arrow T. Actually, there is a pressure drop along the length of each waterway which is proportionate to the distance traveled through the waterway. Accordingly, the pressure at the point P in the waterway S will be substantially less than the pressure at the point M at which the drilling fluid tends to leave the waterway R along the path T. The pressure differential between the point M and the point P tends to cause the fluid to flow in the direction of the arrow T out of the watercourse R and toward the point P in the watercourse S. Of course, the pressure closer to the inlet 25 of the watercourse S than the point P is also substantially less than the pressure in the watercourse R at the point M, so that fluid will also pass in other directions, such as in the direction indicated by the arrow F, across the diamond studded land to the watercourse S. Fluid will flow from different points in the watercourse R to the watercourse S, insuring the cleaning and cooling of the land 20 between the two watercourses in a highly efficient manner.

The same condition will prevail further along the watercourse R in an outward direction, and also with respect to the watercourse S in an outward direction relative to the point P, the fluid tending to move transversely across the curving or spiral land 20 between the watercourses 24, as well as through the watercourses themselves.

The above example, given with respect to watercourses R and S, is also applicable with respect to watercourses S and K, and, for that matter, between all of the watercourses in the drill bit.

The spiral arrangement not only provides for the maintenance of all the lands 20 and the cutting elements 16 therein in a clean and cool condition, but it also provides for a proper concentration of cutting elements across the entire face of the bit. That is to say, the cutting elements 16 per unit of projected area in the outer portion of the bit can be substantially the same as the concentration of cutting elements per unit of area in the intermediate and the inner portions of the bit, so that each cutting element or stone performs substantially equal work and will have substantially the same rate of wear. The net result is a long and very effective life of each drilling bit.

The upper innermost portions 21 of the tapered or frusto-conical lands terminate a relatively short distance from the axis Y of the drill bit. However, the separation between such inner portions of the lands is insufficient to cause the production of a central core that does not readily break off during the drilling operation, to be flushed away by the drilling fluid circulating down through the main body passage 18 and through the fluid passages 23 between the ribs. However, as assurance that no central core will be produced in the formation as a result of rotation of the bit, one of the ribs 19a may extend to the axis Y of the bit and even slightly thereacross, the inclined or frusto-conical face associated with such rib also extending substantially to the axis of the bit and having diamond cutting elements thereon that extend at least to the axis of the bit and possibly slightly thereacross. By virtue of this arrangement, the innermost portion of the land 20 connected to the rib 19a will operate upon the formation at least to the axis of the bit and will prevent any central core, no matter how small in diameter, from being formed in the hole bottom during the rotation of the drilling bit.

In the form of invention disclosed in Figs. 4 and 5, essentially the same arrangement of longitudinal ribs 19, curved generally spiral watercourses 24, and curved or generally spiral diamond-studded lands 20 between the watercourses and at the lower ends of the ribs is provided as in the other form of the bit (Figs. 1 to 3). The central portion of the bit has the frusto-conical face 14a formed collectively in the inner portions of all of the lands 20 to produce the conical central bottom in the hole being drilled, the frusto-conical portion merging into the outer convex portion 15, which also merges into the reaming portion 13 of the bit. The waterways or watercourses 24 extend from the longitudinal grooves 23 between the ribs in a spiral fashion outwardly to the junk slots 27 extending longitudinally along the reaming face of the bit, so as to provide a large area through which the cuttings can be flushed in an upward direction away from the region.

As disclosed in Figs. 4 and 5, a symmetrical arrangement of ribs 19 and lands 20 is provided, the ribs 19 of each pair being diametrically opposite each other, so as to provide a balanced bit. One pair of the ribs 19 and the upper inner portions 21a of the tapered lands 20 may extend inwardly toward a point adjacent the axis Y of the bit, such ribs being spaced slightly apart. There is ample fluid circulation area between the ribs 19 for the fluid to pass without difficulty into and through the waterways 24, some of this fluid also traveling from the several waterways, across the lands, to adjacent waterways. However, the distance Z remaining between the opposed ribs 19 that are closer to one another is insufficient to permit the formation of a core which will remain in place. The core portion, if it tends to form, readily breaks off and is flushed in a downward direction away from the central portion of the hole.

It is, accordingly, apparent that rotary drill bits have been provided for cutting the entire cross-sectional area of the hole, there being fluid circulation passages 18, 23 of large area through the bits and along the watercourses 24, to enable a large volumetric rate of drilling fluid to be pumped through the bit without building up a pressure on the bottom of the hole tending to elevate the bit therefrom. Not only is the circular spiral arrangement of waterways 24 and intervening lands 20 effective to carry the cuttings in an outward direction to the periphery of the bit for upward flushing away from the drilling region, but the curvature of the waterways and intervening lands causes large quantities of drilling fluid to pass transversely from one waterway to the next waterway, flowing across the lands and the diamonds, to clean such lands and diamonds effectively, and maintain them in a cool state. Thus, the diamonds can have maximum penetration into the bottom of the hole for maximum effectiveness in making drilling progress.

I claim:

1. In a rotary drill bit: a body having fluid passage means, said body having a drilling face adapted to engage the bottom of the hole in which the bit is operating, said face beginning closely adjacent the axis of said body and containing a plurality of generally spiral watercourses spaced circumferentially from each other and extending outwardly from said passage means to the outer portion of said body to provide circumferentially spaced generally spiral lands between said watercourses beginning closely adjacent the axis of said body; each land being engageable with the bottom of the hole substantially the full width of the land, the arcuate extent of each watercourse and land ground the drilling face being substantially less than 360 degrees; and cutting elements secured to said lands.

2. In a rotary drill bit: a body having fluid passage means, said body having a bottom hole contacting drilling face beginning closely adjacent the axis of said body and containing a plurality of circumferentially spaced curved watercourses extending laterally from said passage means to the outer portion of said body; said watercourses providing circumferentially spaced curved lands therebetween beginning closely adjacent the axis of said body; each of said watercourses curving outwardly at an increasing angle to a radial line drawn from the body axis; each land being engageable with the bottom of the hole substantially the full width of the land, the arcuate extent of each watercourse and land around the drilling face being substantially less than 360 degrees; and cutting elements secured to said lands.

3. In a rotary drill bit: a body having fluid passage means; circumferentially spaced ribs extending inwardly of said passage means and defining longitudinal fluid passages therebetween; said body having a bottom hole contacting drilling face which includes the lower ends of said ribs and extends laterally outward thereof to the outer portion of said body; the lower end of at least one of said ribs being closely adjacent the axis of said body; said face containing a plurality of circumferentially spaced curved watercourses communicating with said passages and extending laterally from said passages to the outer portion of said body; said watercourses providing circumferentially spaced curved lands therebetween merging into the lower ends of said ribs; each of said watercourses curving outwardly at an increasing angle to a radial line drawn from the body axis; each land being engageable with the bottom of the hole substantially the full width of the land, the arcuate extent of each watercourse and land around the drilling face being substantially less than 360 degrees; and cutting elements secured to said lands and said lower ends of said ribs.

4. In a rotary drill bit: a body having fluid passage means; circumferentially spaced ribs extending inwardly of said passage means and defining longitudinal fluid passage therebetween; said body having a bottom hole contacting drilling face which includes the lower ends of said ribs and extends laterally outward thereof to the outer portion of said body; the lower end of at least one of said ribs being closely adjacent the axis of said body; said face containing a plurality of circumferentially spaced generally spiral watercourses communicating with said passages and extending laterally from said passages to the outer portion of said body; said watercourses providing circumferentially spaced generally spiral lands therebetween merging into the lower ends of said ribs; each land being engageable with the bottom of the hole substantially the full width of the land, the arcuate extent of each watercourse and land around the drilling face being substantially less than 360 degrees; and cutting elements secured to said lands and said lower ends of said ribs.

5. In a rotary drill bit: a body having fluid passage means, said body having a concave inner bottom hole contacting drilling face beginning closely adjacent the axis of said body and merging into an outer bottom hole contacting drilling face; said passage means opening into said inner face; said inner and outer faces containing a plurality of circumferentially spaced curved watercourses extending from said passage means to the outer portion of said body; said watercourses providing circumferentially spaced curved lands therebetween beginning adjacent the axis of said body; each of said watercourses curving outwardly at an increasing angle to a radial line drawn from the body axis; each land being engageable with the bottom of the hole substantially the full width of the land, the arcuate extent of each watercourse and land around the drilling face being substantially less than 360 degrees; and cutting elements secured to said lands.

6. In a rotary drill bit: a body having fluid passage means, said body having a concave inner bottom hole contacting drilling face beginning closely adjacent the axis of said body and merging into an outer bottom hole contacting drilling face; said passage means opening into said inner face; said inner and outer faces containing a plurality of circumferentially spaced generally spiral watercourses extending from said passage means to the outer portion of said body; said watercourses providing circumferentially spaced generally spiral lands therebetween beginning adjacent the axis of said body; each land being engageable with the bottom of the hole substantially the full width of the land, the arcuate extent of each watercourse and land around the drilling face being substantially less than 360 degrees; and cutting elements secured to said lands.

7. In a rotary drill bit: a body having fluid passage means; circumferentially spaced ribs extending inwardly of said passage means and defining longitudinal fluid passages therebetween; said body having a concave inner bottom hole contacting drilling face beginning closely adjacent the axis of said body and which includes the lower ends of said ribs and merges into an outer bottom hole contacting drilling face; said passages opening into said inner face; said inner and outer faces containing a plurality of circumferentially spaced curved watercourses communicating with said passages and extending laterally from said passages to the outer portion of said body; said watercourses providing circumferentially spaced curved lands therebetween merging into the lower ends of said ribs; each land being engageable with the bottom of the hole substantially the full width of the land, the arcuate extent of each watercourse and land around the drilling face being substantially less than 360 degrees; and cutting elements secured to said lands and said lower ends of said ribs.

8. In a rotary drill bit: a body having fluid passage means; circumferentially spaced ribs extending inwardly of said passage means and defining longitudinal fluid passages therebetween; said body having a concave inner bottom hole contacting drilling face beginning closely adjacent the axis of said body and which includes the lower ends of said ribs and merges into an outer bottom hole contacting drilling face; said passages opening into said inner face; said inner and outer faces containing a plurality of circumferentially spaced generally spiral watercourses communicating with said passages and extending laterally from said passages to the outer portion of said body; said watercourses providing circumferentially spaced generally spiral lands therebetween merging into the lower ends of said ribs; each land being engageable with the bottom of the hole substantially the full width of the land, the arcuate extent of each watercourse and land around the drilling face being substantially less than 360 degrees; and cutting elements secured to said lands and said lower ends of said ribs.

9. In a rotary drill bit as defined in claim 3; wherein the lower end of one of said ribs extends at least to the axis of said body.

10. In a rotary drill bit as defined in claim 8; wherein the lower end of one of said ribs extends at least to the axis of said body.

11. In a rotary drill bit as defined in claim 3; wherein the lower ends of a pair of said ribs are disposed adjacent each other on diametrically opposite sides of the axis of said body.

12. In a rotary drill bit as defined in claim 8; wherein the lower ends of a pair of said ribs are disposed adjacent each other on diametrically opposite sides of the axis of said body.

13. In a rotary drill bit: a body having fluid passage means, said body having a bottom hole contacting drilling face beginning adjacent the axis of said body and containing a plurality of circumferentially spaced curved watercourses extending laterally from said passage means to the outer portion of said body; said watercourses providing circumferentially spaced curved lands therebetween beginning closely adjacent the axis of said body; each of said watercourses curving outwardly at an increasing angle to a radial line drawn from the body axis; each land being engageable with the bottom of the hole substantially the full width of the land, the arcuate extent of each watercourse and land around the drilling face being substantially less than 360 degrees; cutting elements secured to said lands; the periphery of said body having longitudinal slots communicating with the outer ends of said watercourses.

14. In a rotary drill bit: a body having fluid passage means; circumferentially spaced ribs extending inwardly of said passage means and defining longitudinal fluid passages therebetween; said body having a bottom hole contacting drilling face beginning closely adjacent the axis of said body and which includes the lower ends of said ribs and extends laterally outward thereof to the outer portion of said body; said face containing a plurality of circumferentially spaced generally spiral watercourses communicating with said passages and extending laterally from said passages to the outer portion of said body; said watercourses providing circumferentially spaced generally spiral lands therebetween merging into the lower ends of said ribs; each land being engageable with the bottom of the hole substantially the full width of the land, the arcuate extent of each watercourse and land around the drilling face being substantially less than 360 degrees; cutting elements secured to said lands and said lower ends of said ribs; the periphery of said body having longitudinal slots therein communicating with the outer ends of said spiral watercourses.

15. In a rotary drill bit: a body having fluid passage means; circumferentially spaced ribs extending inwardly of said passage means and defining longitudinal fluid passages therebetween; said body having a concave inner bottom hole contacting drilling face beginning closely adjacent the axis of said body and which includes the lower ends of said ribs and merges into an outer bottom hole contacting drilling face; said passages opening into said inner face; said inner and outer faces containing a plurality of circumferentially spaced generally spiral watercourses communicating with said passages and extending laterally from said passages to the outer portion of said body; said watercourses providing circumferentially spaced generally spiral lands therebetween merging into the lower ends of said ribs; each land being engageable with the bottom of the hole substantially the full width of the land, the arcuate extent of each watercourse and land around the drilling face being substantially less than 360 degrees; cutting elements secured to said lands and said lower ends of said ribs; the periphery of said body having circumferentially spaced longitudinal slots therein communicating with the outer ends of said watercourses.

References Cited in the file of this patent

UNITED STATES PATENTS

| | | |
|---|---|---|
| 2,381,415 | Williams | Aug. 7, 1945 |
| 2,612,348 | Catallo | Sept. 30, 1952 |
| 2,614,809 | Zublin | Oct. 21, 1952 |

FOREIGN PATENTS

| | | |
|---|---|---|
| 979,107 | France | Apr. 23, 1951 |